US009112878B2

(12) United States Patent (10) Patent No.: US 9,112,878 B2
Kumar (45) Date of Patent: Aug. 18, 2015

(54) SYSTEM AND METHOD FOR HAND-OFF MAINTENANCE

(75) Inventor: Ramadoss Kumar, Tamilnadu (IN)

(73) Assignee: Alcatel Lucent, Boulogne Billancourt (FR)

( * ) Notice: Subject to any disclaimer, the term of this patent is extended or adjusted under 35 U.S.C. 154(b) by 502 days.

(21) Appl. No.: 13/505,419

(22) PCT Filed: Nov. 23, 2009

(86) PCT No.: PCT/IB2009/056018
§ 371 (c)(1),
(2), (4) Date: Aug. 1, 2012

(87) PCT Pub. No.: WO2011/061577
PCT Pub. Date: May 26, 2011

(65) Prior Publication Data
US 2012/0294282 A1    Nov. 22, 2012

(51) Int. Cl.
*H04L 1/22*       (2006.01)
*H04L 29/06*      (2006.01)
(52) U.S. Cl.
CPC ........ *H04L 65/1043* (2013.01); *H04L 65/1046* (2013.01)
(58) Field of Classification Search
USPC .......................... 370/331, 338, 218, 219, 220
See application file for complete search history.

(56) References Cited

U.S. PATENT DOCUMENTS

2005/0105559 A1* 5/2005 Cain et al. ............... 370/498
2010/0234025 A1* 9/2010 Julka ....................... 455/436
2012/0106318 A1* 5/2012 Gu et al. .................. 370/216

OTHER PUBLICATIONS

"Gateway control protocol: Version 2; H.248.1" Sep. 13, 2005, ITU-T Draft Study Period 2005-2008, International Telecommunication Union, Geneva ; CH, XP017404788.
Madhubabu Brahmanapally Veraz Networks Prepera Viswanadham Marconi Krishna Gundamaraju ADC Telecommunications: "Megaco/H.248 Call flow examples; draft-ieft-megaco-callflows-04. txt" IETF Standard-Working-Draft, Internet Engineering Task Force, IETF, CH, vol. megaco, No. 4, Nov. 12, 2004, XP015038600 ISSN: 0000-0004 p. 144-p. 146.

* cited by examiner

*Primary Examiner* — Huy Vu
*Assistant Examiner* — Zewdu A Beyen
(74) *Attorney, Agent, or Firm* — Harness, Dickey & Pierce

(57) ABSTRACT

A system and method for hand-off maintenance is disclosed. The present invention relates to communication networks and particularly, to network interfaces in communication networks. In existing hand-off mechanisms, when a restart occurs in a Media Gateway, the Media Gateway always tries to register back to the primary Media Gateway Controller, which is under maintenance. As the primary Media Gateway Controller cannot address the request, calls running on the Media Gateway will be affected leading to abrupt release of calls. The method provides a solution to the problem by rejecting service requests from the Media Gateway that are already handed off at the Media Gateway. Further, at Media Gateway level not to register requests to the primary Media Gateway Controller, when a primary Media Gateway Controller is under maintenance. When the primary Media Gateway Controller is under maintenance, requests are directed to the secondary Media Gateway Controller. The secondary Media Gateway Controller then serves the requests to the Media Gateway until the primary Media Gateway Controller is back to operation.

18 Claims, 10 Drawing Sheets

SYSTEM AND METHOD FOR HAND-OFF MAINTENANCE

TECHNICAL FIELD

The present invention relates to communication networks and, more particularly, to network interfaces in communication networks.

BACKGROUND

Media Gateway Controller (MGC) redundancy concept is employed in present day communication networks. MGC redundancy concept is based on a one-plus-one concept or active-active concept, where both the MGC's are maintained in active state for operation. In cases, wherein one of the MGC fails or may be taken out for maintenance reasons, the other MGC of the pair takes over the control of Media Gateway (MG) served by the failed MGC. The concept is based on static allocation of MG to the MGC of a pair. Each MG has a preliminary link connected to one MGC (primary MGC) and a secondary link connected to another MGC (secondary MGC). During manual maintenance of MGC, MG served by the MGC may be directed to secondary MGC by sending a hand-off request.

The drawbacks involved in the above mentioned hand-off mechanism is that, if a restart occurs on the MG after the MG is successfully registered with the secondary MGC, the MG tries to connect to the primary MGC instead of secondary MGC. Further, if the maintenance is not yet started on the primary MGC, the primary MGC accepts the connection request from the MG without the knowledge of network operator. As a result, the MG is not served when the MGC goes for maintenance. On the other hand, when there is an internal failure in the processor handling the concerned MG, the connection between the MG and secondary MGC is lost. The MG may again re-register with the primary MGC by sending a service request to establish the connection. But the primary may not be able to serve the MG as it is under maintenance. Due to these problems, all calls running on the concerned MG will be affected. Also, the network operator is not aware that a MG is actually registered to the MGC under maintenance.

MG and MGC are separated by a long distance, and actions done at the MG side are not known at the MGC level. Data related to all MGs are configured before hand on the MGC. If a new MG is to be serviced by a primary MGC, which is to be under maintenance, the service request sent from the MG is accepted by the primary MGC without the knowledge of the network operator. Because of the above reasons, calls running on the concerned MG are affected and abrupt release of calls takes place. Also, there is no standardization aspect in existing hand-off mechanisms.

SUMMARY

In view of the foregoing, an embodiment herein provides a Media Gateway Controller (MGC) in a communication network. The MGC provided with atleast one means for triggering hand-off for a plurality of Media Gateways (MG's) controlled by the MGC, setting a flag for indicating hand-off to the MGs, sending a service change reason and address of a secondary MGC to plurality of the MGs, receiving a reply for the service change reason from atleast one MG, receiving a reply for the service change reason from the secondary MGC and rejecting any service change reason from the MGs after the MGC is not available. The service change reason sent to said MG includes a reason for service change and a property. The service change reason sent to the secondary MGC includes a reason for service change. The MGC is functioning in a geo redundancy environment. The flag is sent to the MG in the form of a property. The MGC communicates with the MGs using H.248 protocol interface.

Embodiments further disclose a Media Gateway (MG) in a communication network. The MG configured with atleast one means for sending a service change reason to a secondary Media Gateway Controller (MGC) for registration on determining that a primary Media Gateway Controller (MGC) is not available, receiving a reply for the service change reason from the secondary MGC, storing status of a flag received in the service change reason, sending the service change reason to the primary MGC, on receiving an indication from the primary MGC that the primary MGC is back in normal operation and receiving a reply for the service change reason from the primary MGC. The reply for the service change reason includes a method and a property. The flag status is indicated to the MG via a property in the reply for service change.

Also disclosed herein is a method for hand-off maintenance in a communication network. The network comprising of a primary Media Gateway Controller (MGC), a secondary MGC and plurality of Media Gateways (MGs). The method comprising steps of a primary MGC setting a flag for a plurality of the MGs indicating hand-off mechanism for the MGs, when the primary MGC is not availabl the primary MGC sending a service change reason and address of the secondary MGC to plurality of MGs, the MG sending the service change reason to the secondary MGC, the MGs storing the flag status received in the service change reason, the MGC sending the service change reason to the secondary MGC, the secondary MGC validating the reason and the secondary MGC connecting to the MG for providing service to the MG. The method sends the service change reason to the primary MGC, when the primary MGC is back into normal operation and receives a reply for the service change reason from the primary MGC, when the primary MGC is back into normal operation. The service change reason includes a reason for service change and a property. The primary MGC and the secondary MGC communicate via SIP protocol in a geo redundancy environment. The flag is sent to the MGs in the form of property.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF EMBODIMENTS

Figure 1:
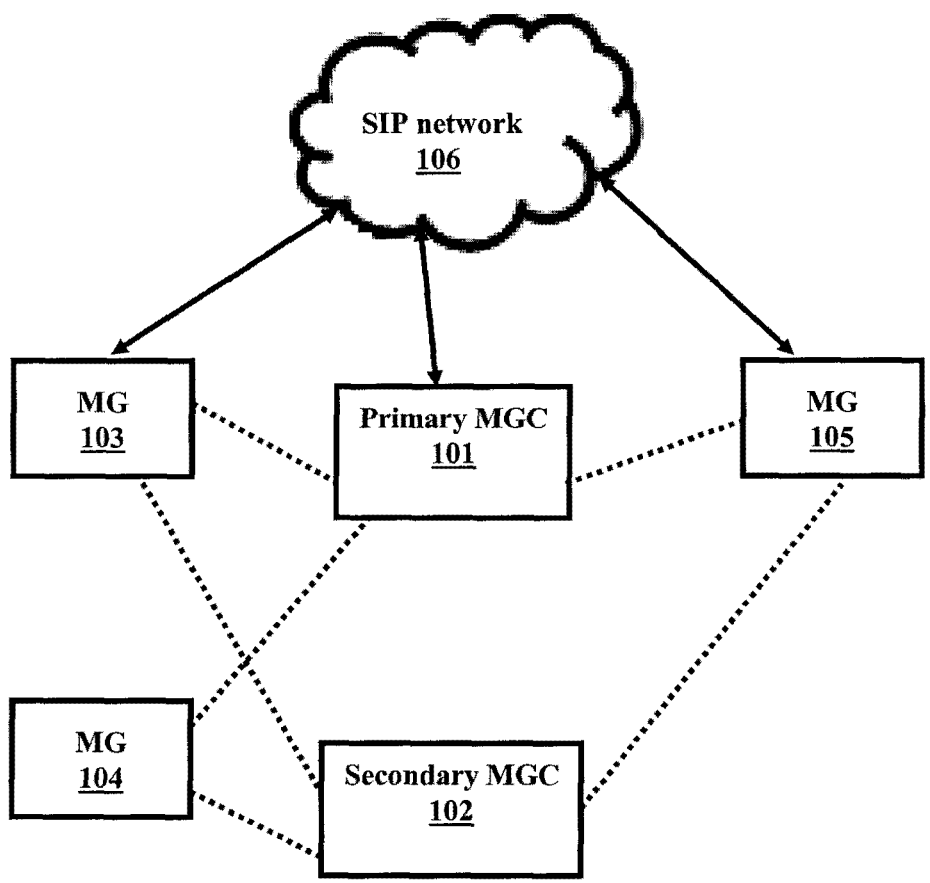
FIG. 1 illustrates a system for handling hand-off mechanism, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a method for hand-off maintenance of Media Gateway Controller by providing systems and methods thereof. Referring now to the drawings, and more particularly to FIGS. 1 through 9, where similar reference characters denote corresponding features consistently throughout the figures, there are shown embodiments.

A system and method for handling hand-off mechanism in a Media Gateway controller (MGC) is disclosed. The system employs a method for handling Media Gateways (MG), when the MGC to which the MG is registered is under maintenance. In a geo redundancy environment, a pair of MGC function together to address the functioning of MGs, wherein one of the MGCs is the primary MGC and the other MGC is the secondary MGC. In case of non operational state of a primary MGC, the functionality is taken over by the secondary MGC. All MGs served by the primary MGC are now served by the secondary MGC after sending a hand-off signal. When the primary MGC is under maintenance, a flag is set in the primary MGC for hand off of the MGs served by the primary MGC to the secondary MGC. The primary MGC sends a service change reason to the MGs being served by it. The service change reason message may also provide reason for service change, a property and flag status set in the MGC. The reason for service change may be stated as 'service change reason' include messages like 'service change directed by primary MGC', 'maintenance of primary MGC' and the like. Property may be stated as 'new property in any existing H.248 package' and may indicate a 'tag' such as 'g/grhandoff' and a 'value' such as 'true' or 'false' and the like. The primary MGC may further send the reason to the MG, which then sends the reason to the secondary MGC.

The MG on receiving the service change reason, stores the status of the flag. Further, the MG sends a service change reason message to the secondary MGC to establish connection with the secondary MGC. The MG stores the property in itself for any further use. The secondary MGC on receiving the service change reason message checks for the reason. If the reason is valid, the secondary MGC accepts the service change reason from the MG. The MG is now registered with the secondary MGC. The secondary MGC then handles the requests of the MG without any interaction of the network operator. When the primary MGC is back into normal operation after maintenance, the flag on the primary MGC is reset. Further, any requests from the MGs are directed back to the primary MGC and the primary MGC handles the functioning of the MGs.

FIG. 1 illustrates a system for handling the hand-off mechanism, according to embodiments as disclosed herein. The description herein is with reference to Session Initiation Protocol (SIP) network, however does not aim to limit the scope of the embodiments to SIP networks. The system depicts a geo redundancy environment with a SIP network 106, a primary MGC 101, a secondary MGC 102, a plurality of MGs 103, 104 and 105. MGs 103, 104 and 105 are connected to the primary MGC 101 via a primary link and to the secondary MGC 102 via a secondary link.

The primary MGC 101 contains registration details of all the MGs 103, 104 and 105 served by the primary MGC 101. When the primary MGC 101 is under maintenance, all the MGs 103, 104 and 105 served by the primary MGC 101 are designated to the secondary MGC 102. When the primary MGC 101 is under maintenance, a flag is set on the primary MGC 101 indicating hand-off of MGs 103, 104 and 105 to the secondary MGC 102. Further, any registration requests to the primary MGC 101 are rejected by the primary MGC 101. The primary MGC 101 then sends a service change reason message to the MGs 103, 104 and 105. The service change message may also include status of the flag, a reason and property of the message. The flag indicates if hand-off has occurred or not. The primary MGC 101 also sends the address of the secondary MGC 102 to the MG 103 the MG 103 then sends the service change reason message to the secondary MGC 102 indicating reason for the service change. The reason for service change may be stated as 'service change reason' and indicated as 'MGC directed change in GR' and the like.

The secondary MGC 102 takes over the functioning of the primary MGC 101 on either failure or maintenance condition of the primary MGC 101. The secondary MGC 102 performs the function of checking for the reason in the service change reason message. If the reason is valid, the secondary MGC 102 serves the MGs 103, 104 and 105. The secondary MGC 102 also performs the function of sending a manual handoff trigger to the MGs 103, 104 and 105 when the primary MGC 101 is back in normal operation.

The MGs 103, 104 and 105 on receiving the service change reason message store status of the flag. Then, MGs 103, 104, and 105 may send a service request message to the secondary MGC 102 for connection. The service request message may include a new reason that indicates hand-off. The reason may be stated as 'service change reason' and may be of the form like 'MGC directed change' and the like. On receiving the service request message, the secondary MGC 102 validates the reason for service change by checking if hand-off has occurred from the primary MGC 101. If the reason is valid, then the request is accepted and the MGs 103, 104 and 105 are served. After maintenance of the primary MGC 101, the MGs 103, 104 and 105 are switched back to the primary MGC 101 for service via a manual handoff trigger. The flag on the primary MGC 101 is then reset. The secondary MGC 102 then sends a new property to the MGs 103, 104 and 105. The property may be stated as 'new property in any existing H.248 package' and be of the form 'grhandoff=false', after which the MGs 103, 104 and 105 reset the stored flag. The MGs 103, 104 and 105 register with the primary MGC 101 by sending a service request message. The primary MGC 101 then resets the flag stored on it for the concerned MG.

Figure 2:
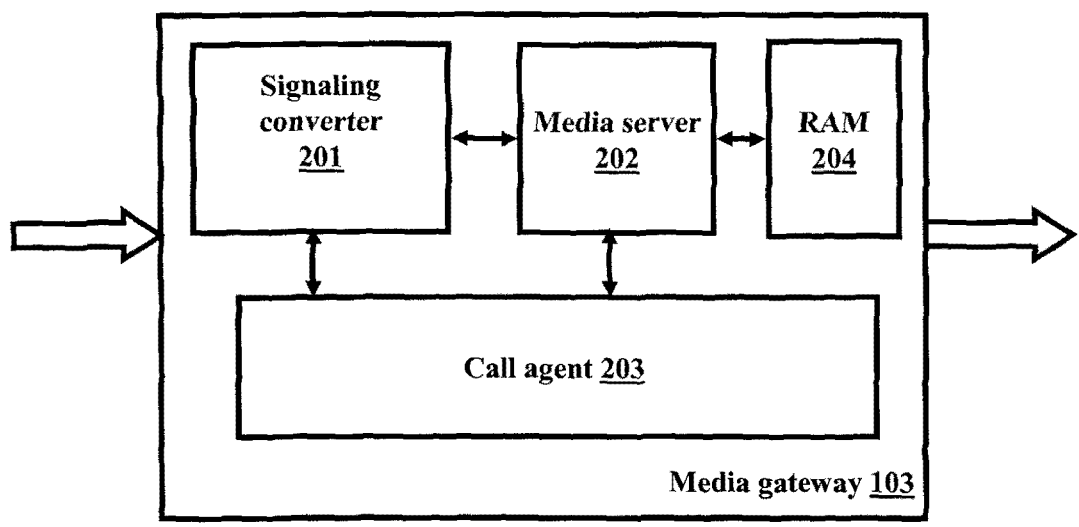
FIG. 2 illustrates a media gateway (MG), according to embodiments as disclosed herein.

FIG. 2 illustrates a media gateway (MG), according to embodiments as disclosed herein. The Media Gateway (MG)

103 comprises of a signal converter 201, a media server 202, a call agent 203 and a RAM 204. The MG 103 converts media provided in one type of network to the format required in another type of network. For example, a MG 103 could terminate bearer channels from a switched circuit network (e.g. DS0s) and media streams from a packet network (e.g. RTP streams in an IP network). The MG 103 may be capable of processing audio, video and T.120 alone or in any combination, and may be capable of full duplex media translations. The MG 103 may also play audio/video messages and perform other IVR functions, or may perform media conferencing. Media streaming functions such as echo cancellation, Dual Tone Multi Frequency (DTMF), and tone sender are also located in the MG 103. The MG 103 is often controlled by a separate Media Gateway Controller, which provides the call control and signaling functionality. Communication between the MG 103 and the Call Agent 203 is achieved by means of protocols such as the Media Gateway Control Protocol (MGCP) or Megaco (H.248) or Session Initiation Protocol (SIP). The MGs used in SIP networks are often stand-alone units with their own call and signaling control units integrated and can function as independent, intelligent SIP end-points.

The signal converter 201 handles all the signals received by the MG 103 and performs conversion on the signals if required. In an example, the signal converter 201 may convert received switched circuit signals to packet switched signals and so on. Any signal received may be converted into the required format at the output. The signal converter 201 interfaces with the media server 202 and the call agent 203 within the MG 103. When hand-off is triggered, signal converter 201 is informed by the call agent 203 that it has to communicate with the secondary MCG 102. The signal converter 201 receives signals from the secondary MGC 102 and processes the signals accordingly.

The media server 202 handles the functioning of components in the MG 103. The media server 202 maintains a record of the functions to be performed on the data received by the MG 103. The media server 202 may be configured with set of instructions to be performed when the MG 103 is handed off. Depending on the instructions record on the media server 202, the media server may issue signals for the functioning of other units of the MG 103. The media server 202 is interfaced with a Random Access Memory unit (RAM) 204. The RAM 204 stores any data required for processing of the signals. The MG 103 may be configured for specific applications by storing specific sets of instructions in the RAM 204. RAM 204 may be configured to store the status of the flags sent to MG 103 by the primary MGC 101. In addition, RAM 204 may also store the reason and property sent to the MG 103 in the service change reason.

The call agent 203 is responsible for handling all the call processing functions within the MG 103. The call agent 203 also handles user specific functions and applications. When the MG 103 is handed off by the primary MGC 101, the call agent is informed of the hand-off. The call agent 203 takes care that all the further service requests of MG 103 is sent to the secondary MGC 102. In case the user makes any changes in the property of the service message, the call agent 203 takes care of its implementation.

Figure 3:
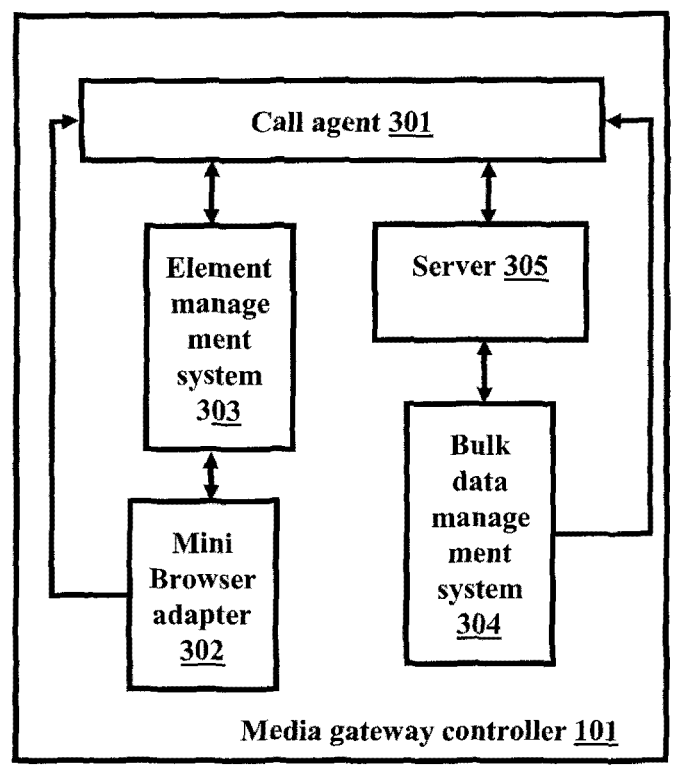
FIG. 3 illustrates a media gateway controller (MGC), according to embodiments as disclosed herein.

FIG. 3 illustrates a media gateway controller (MGC), according to embodiments as disclosed herein. The media gateway controller (MGC) 101 comprises of a call agent 301, a mini browser adapter 302, an element management system 303, a bulk data management system 304 and a server 305. The call agent 301 is concerned with handling specific services to the users. The call agent 301 handles switching logic and call control for all sites including the MGs 103, 104 and 105 controlled by the primary MGC 101. The MGC 101 includes both centralized configuration and maintenance of call control functionality. When new functionality needs to be added, only the MGC 101 needs to be updated. The call agent 301 is the logic responsible for registration and management of resources at the MG 103 and is responsible for functions such as billing and routing. In Session Initiation Protocol (SIP) networks, the Call Agent 301 registers and proxies for all endpoints in a domain, including phones as well as MGs 103, 104 and 105. When the MG 103 is triggered hand-off, call agent 301 takes up the responsibility of sending control signals to all the units of the MGC 101 to stop accepting any further service requests from the MG 103.

The mini browser adapter 302 performs the function of retrieving, presenting and traversing information across the network. Any information required during hand-off process is fetched by the mini browser adapter 302. Mini browser adapter 302 accesses information provided by the server 305. Mini browser adapter 302 provides connections to links fetched from the server 305. When a link is clicked, browser navigates to the resource indicated by the link's target Uniform Resource Identifier (URI), and process of bringing content to the user begins. During the call handling sessions any information which is to be accessed from the server 305 is fetched by the mini browser adapter 302.

Element management system 303 comprises of systems and applications concerned with managing network elements on the network element management layer. Key functionality of the element management system 303 is fault detection, configuration of the components, accounting, performance management and providing security. The element management system 303 takes care of any faults if occurred after hand-off is triggered i.e., it takes care that hand-off signal is sent to the MG 103 and no further service requests are accepted by the primary MGC 101.

Bulk data management system 304 handles large bulks of data stored in the MGC 101. Since MGC 101 stores information related to all the MGs 103, 104 and 105 under its control, data associated with the MGC 101 is relatively bulky. In order to handle such large volumes of data, bulk data management system 304 is employed in the MGC 101. Data related to service requests such as the reason, property the status of the flags and the like are maintained in the bulk data management system 304. The server 305 functions according to the controlling logic provided by the MGC 101. During hand-off, the server 305 is informed to issue signals such that the control is transferred to the secondary MGC 102 for providing service. The server 305 accepts any service change reasons transferred from the mini browser adapter 303 and processes the requests accordingly.

Figure 4:
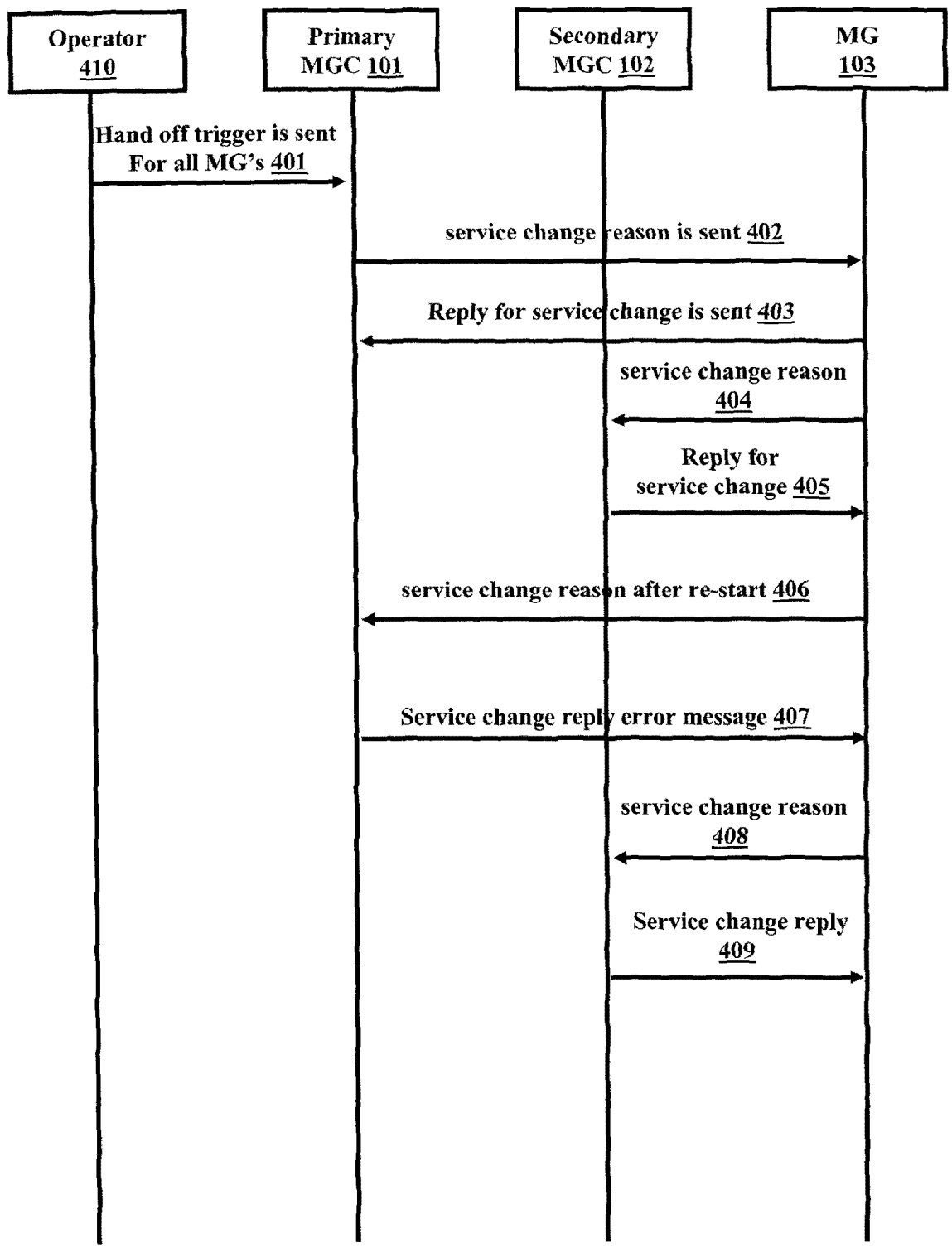
FIG. 4 is a sequence diagram illustrating the process of handling MG after restart, according to embodiments as disclosed herein.

FIG. 4 is a flow diagram illustrating the process of handling MG after restart, according to embodiments as disclosed herein. When the primary MGC 101 is under maintenance, hand-off is triggered on the MGs 103, 104 and 105 handled by the primary MGC 101. A flag 'X' is maintained for MGs 103, 104, and 105 in the primary MGC 101 to indicate the hand-off trigger. While triggering hand-off for each MG 103, 104 and 105, a new flag 'Y' is sent from the primary MGC 101 to MGs 103, 103 and 105. Flag 'Y' that indicates 'g/grhandoff=true' may be sent in a generic package 'g'. Also, a new service change reason 'MGC directed change in GR' may be provided and sent to the MGs 103, 104 and 105 with a method and tag as 'handoff'. The secondary MCG 102 shall always accept registration requests if the service change reason specified is 'MGC directed change in GR'.

Consider a case, wherein hand-off is triggered (401) for the MG 103 by the operator 410. When hand-off is triggered, flag 'X' is set on the primary MGC 101 indicating that the primary MGC 101 will no longer service the MG 103. The primary MGC 101 then sends (402) a service change reason to the MG 103. The service change reason may also include method 'handoff' that indicates that hand-off has occurred, a reason stated as 'service change reason' may be of the form 'MGC directed change in GR' and a flag 'Z' for indicating MGC directed change. The service change reason also includes a property stated as 'new property in any existing H.248 package' and may be of the form 'g/grhandoff=true', where value 'true' indicates that hand-off is taken place in a geo redundancy environment and instructs the MG 103 to perform actions required accordingly. A flag 'Y' is sent to the MG 103 to indicate the property. Once the MG 103 receives the service change reason, the MG 103 stores the status of all the flags on it. MG 103 makes a check for the property 'true' so as to verify the hand-off. On the property being true, the MG 103 sends (403) a reply in the form of an acknowledgment to the service request. Further, the MG 103 sends (404) a service change reason to the secondary MGC 102 requesting the secondary MGC 102 for providing service to the MG 103. The service change reason may also include a method indicating that hand-off has occurred with a reason stated as 'service change reason' and be of the form 'MGC directed change in GR'. The reason may be indicated by the status of 'Z' flag. The secondary MGC 102 on receiving the service change reason validates the status of the flag by checking for the reason. The secondary MGC 102 then sends (405) a reply in the form of an acknowledgment to the MG 103 for the service change reason.

If a restart occurs at the MG 103 at this stage, the MG 103 is configured in such a way that the service change reason after restart is sent to the secondary MGC 102. Restart may occur due to several reasons such as the battery going off, loss of connectivity, lack of network coverage and the like. The service change reason is sent (406) to the primary MGC 101. The service change reason may include a method 'restart' indicating restart has taken place, and a reason such as 'cold boot' to indicate that the system failed due to cold boot. Also, 'Z' flag on the MG 103 may be lost due to restart process. The primary MGC 101 on receiving the service change reason rejects the request for service, as the primary MGC 101 is under maintenance. The primary MGC 101 sends (407) an error response message to the MG 103. The message may be of the form 'g/grhandoff=true' indicating the property is true and also includes 'MGCldToTry' indication message. On receiving the error message the MG 103 sends (408) a service change reason to the secondary MGC 102. The service change reason indicates method as 'failover' and reason as 'MGC directed change in GR' with flag 'Z' set. The MG 103 then sends (409) a reply for service change to the secondary MCG 102. The secondary MGC 102 accepts the registration by validating the 'Z' flag and serves the MG 103.

Figure 5A:
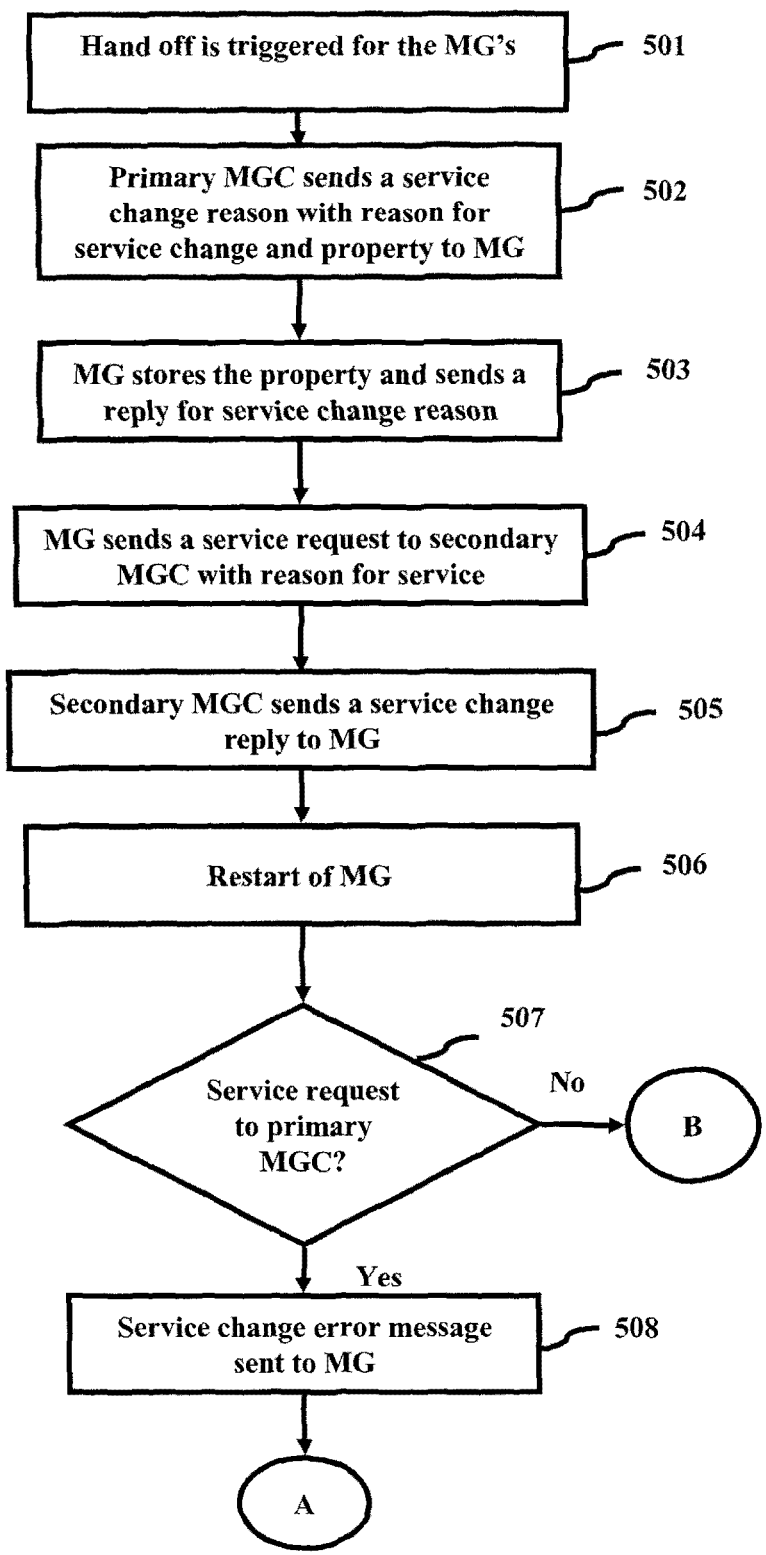
FIGS. 5a and 5b are flow charts depicting the process of handling MG after restart, according to embodiments as disclosed herein.
Figure 5B:
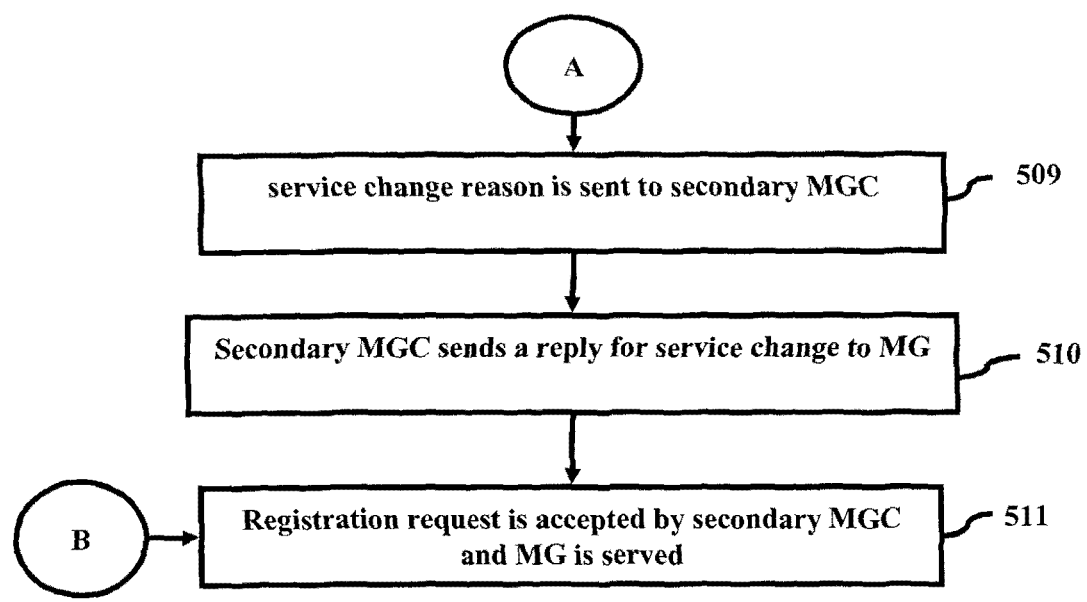

FIG. 5 is a flow chart depicting the process of handling MG after restart, according to embodiments as disclosed herein. When the primary MGC 101 is under maintenance, the operator 410 triggers (510) hand-off for MGs 103 served by the primary MGC 101. A flag 'X' is set on the primary MGC 101 indicating hand-off for the MG 103. The primary MGC 101 sends (502) a service change reason and property to the MG 103. The reason may be stated as 'service change reason' and of the form 'MGC directed service change' and so on. The MG 103 on receiving the service change reason message stores the property in the form of a flag 'Y' on it. The MG 103 then sends (503) a reply in the form of service change reason to the primary MGC 101. The MG 103 sends (504) a service request to the secondary MGC 102 with a reason for the service change. The service change reason may provide a method stating 'handoff' to indicate that hand-off has occurred on the primary MGC 101 due to which the secondary MGC 102 is requested for service and a reason stating 'service change reason' that hand-off is directed by primary MGC. The secondary MGC 102 checks for the validity of the message and then sends (505) a reply in the form of an acknowledgment. Further, a restart may occur (506) on the MG 103. After the restart, a check (507) is made if the service request is sent to the primary MGC 101. In case request is sent to the primary MGC 101, a service error message is sent (508) from the primary MGC 101 to the MG 103. On the other hand, if the service request is sent to the secondary MGC 102, the secondary MGC 102 accepts the request and serves the MG 103. The MG 103 then sends (509) a service change reason to the secondary MGC 102. The secondary MGC 102 sends (510) a reply for the service request to the MG 103 and the MG 103 is served by the secondary MGC 102. The various actions in method 500 may be performed in the order presented, in a different order or simultaneously. Further, in some embodiments, some actions listed in FIG. 5 may be omitted.

Figure 6:
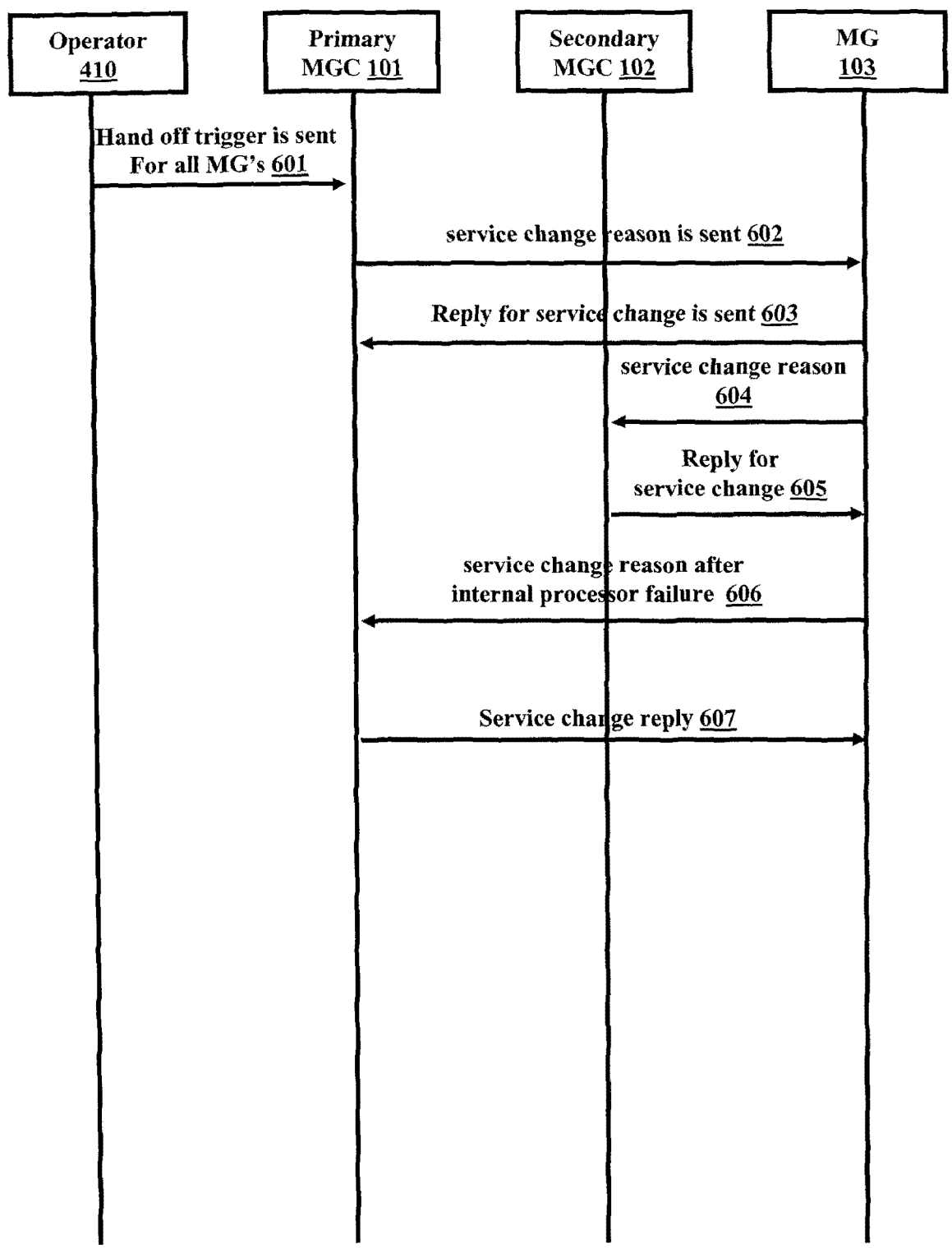
FIG. 6 is a sequence diagram illustrating handling of MG during internal processor failure at secondary MGC, according to embodiments as disclosed herein.

FIG. 6 is a flow diagram illustrating handling of MG during internal processor failure at secondary MGC, according to embodiments as disclosed herein. The embodiments here deal with handling the MG 103 during failure of internal processor. The operator 410 triggers (601) hand-off for MG 103 when the primary MGC 101 is under maintenance. The primary MGC 101 sends (602) a service change reason to the MG 103 indicating hand-off. The service change reason may include details such as method 'handoff' and a reason as 'MGC directed change in GR' and a property 'g/grhandoff=true'. The reason may be stated as 'service change reason' and property as 'new property in any existing H.248 package'. The reason indicates that the service is directed by the primary MGC 101 as it is under maintenance and property indicates that flag 'Y' is set. The MG 103 sends (603) reply for service change to the primary MGC 101. The MG 103 sends (604) service change reason to the secondary MGC 102. The service change reason is sent with details such as method and reason for hand off. The reason is indicated by setting a flag 'Z'. The secondary MGC 102 sends (605) reply for service change reason to the MG 103.

An internal failure occurs on the secondary MGC 102 triggering heartbeat failure with the MG 103. The MG 103 checks the stored flag 'Y' and sends (606) the service request to the secondary MGC 102. The service change reason may include a method and a reason for service change. The method 'disconnected' indicates there is an internal failure in the MG 103 and once the MGC 101 recovers, the MG 103 sends service request to the secondary MGC 102. The reason indicates the change is directed by the primary MGC 101, this is also indicated by flag 'Z'. The secondary MGC 102 checks for the status of the flag 'Z', which indicates if the hand-off trigger is released and further accepts (607) the request from the MG 103. The secondary MGC 102 then serves the MG 103 until the primary MGC 101 is put back into operation.

Figure 7:
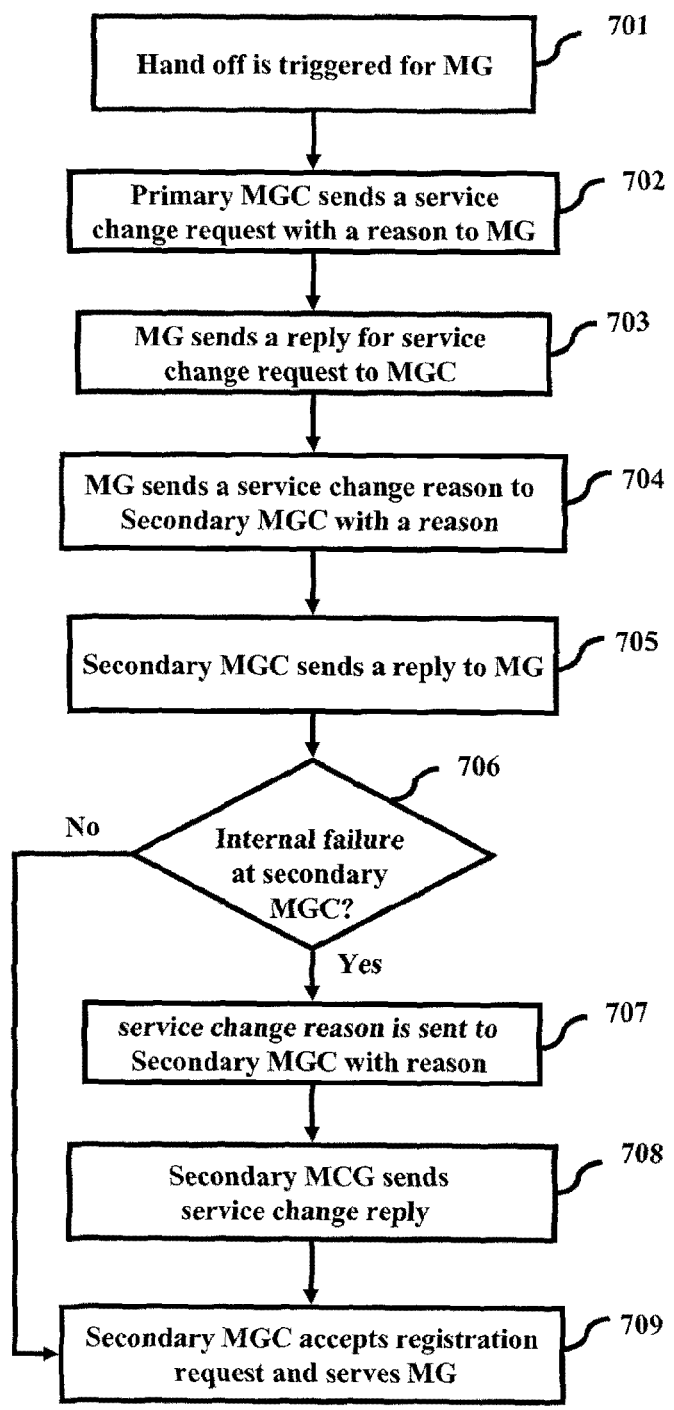
FIG. 7 is a flow chart depicting the process of handling MG during internal processor failure at secondary MGC, according to embodiments as disclosed herein.

FIG. 7 is a flow chart depicting the process of handling MG during internal processor failure at secondary MGC, according to embodiments as disclosed herein. When the primary MGC 101 is under maintenance, operator triggers (701) the MG 103. Operator sends a message to the primary MGC 102 indicating trigger of the MG 103. The primary MGC 102 sends (702) service change reason to the MG 103 with a reason. The reason may be of the form 'MGC directed change in GR' that indicates the change is directed by the primary MGC, which is under maintenance. A flag 'Z' is set to indicate the reason such as handoff triggered and flag 'Y' is set to indicate the property. The MG 102 sends (703) reply to the service change reason received from the MG 102. The MG further sends (704) service change reason to the secondary MGC 102 with the reason. On receiving the service change reason, the secondary MGC 102 sends (705) reply to service change reason.

A check (706) is made if internal failure of the processor has occurred at the secondary MGC 102. When the MG 103 recovers back after internal failure, the MG 103 resends (707) service request to the secondary MGC 102. The service change reason may include a method and a reason for the service change. The method 'disconnected' indicates there is an internal failure in the MG 103 and once the MG 103 recovers, MG 103 sends service request to the secondary MGC 102. Reason indicates the change is directed by the primary MGC 10. In addition, directed change is also indicated by the flag 'Z'. The secondary MGC 102 sends (708) reply to service change reason message. The secondary MGC 102 checks for the status of the flag 'Z'. Flag 'Z' indicates if hand-off is still triggered and further accepts (709) the request from the MG 103. Secondary MGC 102 then serves MG 103 until the primary MGC 101 is put back into operation. The various actions in method 700 may be performed in the order presented, in a different order or simultaneously. Further, in some embodiments, some actions listed in FIG. 7 may be omitted.

Figure 8:
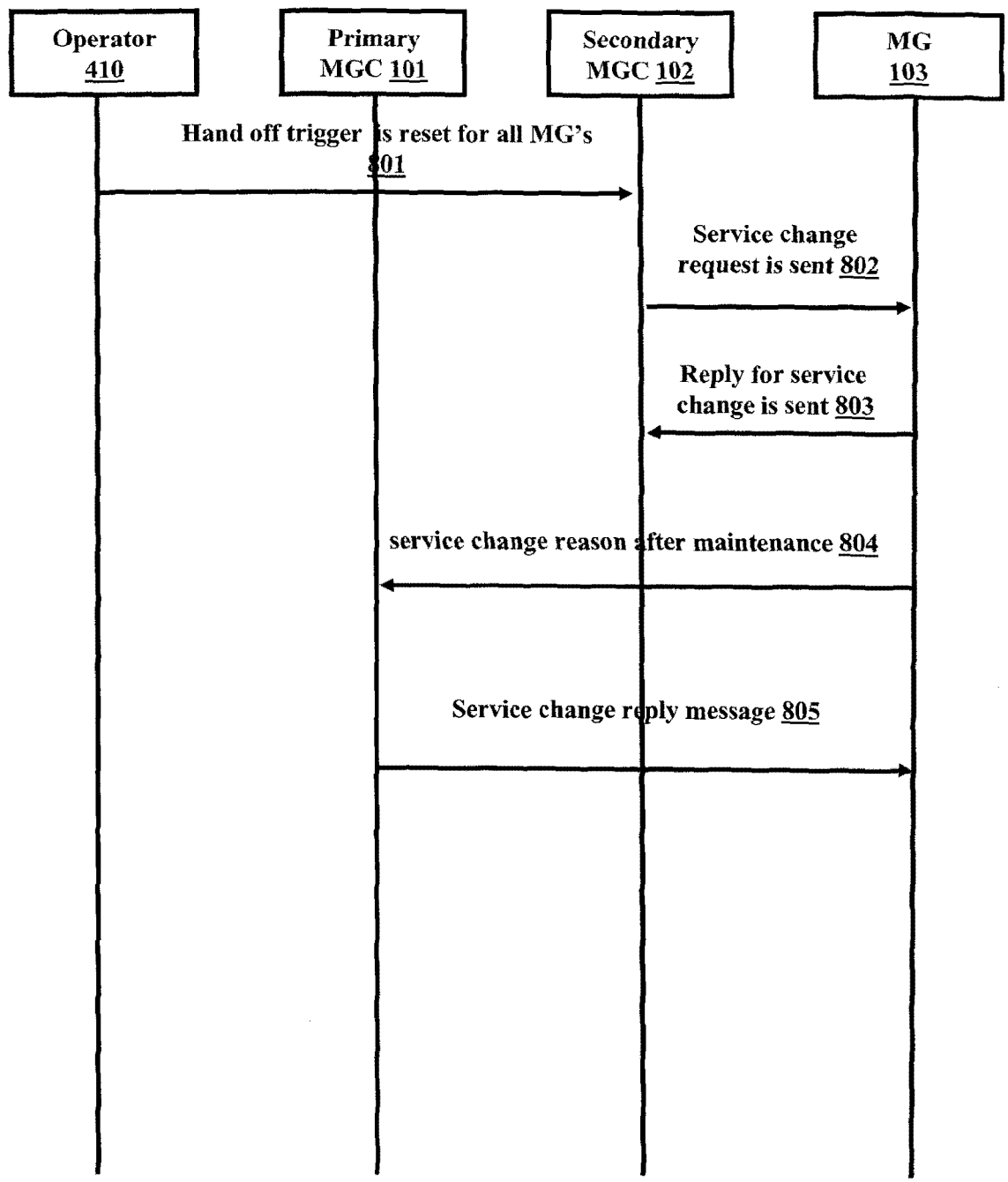
FIG. 8 is a sequence diagram illustrating switch back of MG after maintenance, according to embodiments as disclosed herein.

FIG. 8 is a flow diagram illustrating switch back of MG after maintenance, according to embodiments as disclosed herein. When the primary MGC 101 gets back after maintenance, the function of servicing the MG 103 is switched back to the primary MGC 101. The hand-off triggered for the MG 103 is released and the flag in the primary MGC 101 (i.e., flag 'X') is reset. The operator sends (801) a hand-off release signal to the secondary MGC 102, indicating the primary MGC 101 can now handle the functionality of MG 103. The secondary MGC 102 sends (802) a service change reason to the MG 103. Service change reason may include a method and a reason. Method indicates 'handoff' and reason indicates 'g/grhandoff=false' i.e., flag 'Y' is reset. The MG 103 then sends (803) a reply to service change reason to the secondary MGC 103. While sending the reply for service change the flag 'Y' shall be reset. Since flag 'Y' is reset, the MG 103 shall know that it has to contact the primary MGC 101 for service. The MG 103 then sends (804) service change reason to the primary MGC 101 stated as 'service change reason' and a property stated as 'new property in any existing H.248 package'. Method specifies 'handoff' and reason specifies 'g/grhandoff=false'. Primary MGC 101 on receiving the service request validates the request for the status of flag 'Y' and stored the property. Primary MG 101 sends (805) reply for the service change to the MG 103. Further, flag 'X' within the primary MGC 101 shall be reset for the MG 103.

Figure 9:
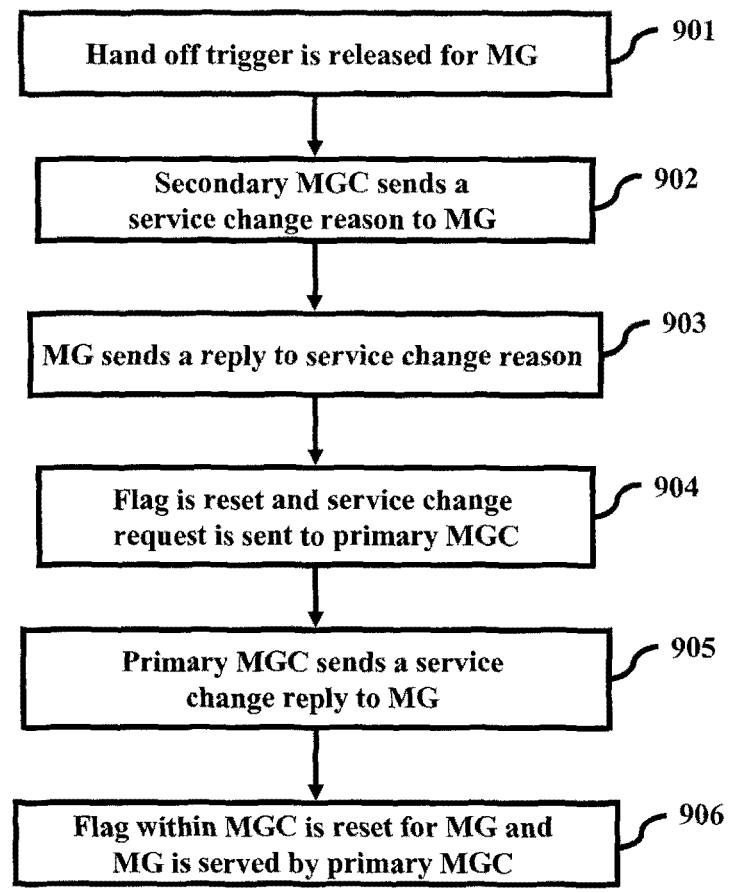
FIG. 9 is a flow chart depicting switch back of MG after maintenance, according to embodiments as disclosed herein.

FIG. 9 is a flow chart depicting switch back of MG after maintenance, according to embodiments as disclosed herein. When the primary MGC 101 is back after maintenance, handoff trigger is released. Operator sends (901) a release of handoff trigger to the secondary MGC 102, indicating the secondary MGC 102 is ready for service of the MG 103. Secondary MGC 102 sends (902) service change reason to the MG 101. The service change reason is provided with a reason and property as 'new property in any existing H.248 package' for service change. The MG 103 stores the property on it. The MG 103 sends (903) reply for service change reason. Further, flag 'Y' stored within the primary MGC 101 may be reset. Once the flag 'Y' is reset, the MG 103 infers that the primary MGC 101 is back to normal operation and service change reason is to be sent to the primary MGC 101. MG 103 sends (904) service change reason to the primary MGC 102. Service change reason is sent along with reason and method. The primary MGC 101 on receiving service change reason sends (905) reply for the service change to the MG 103. Further, flag 'X' within primary MGC 101 will be reset for MG 103. The various actions in method 900 may be performed in the order presented, in a different order or simultaneously. Further, in some embodiments, some actions listed in FIG. 9 may be omitted.

The embodiments disclosed herein can be implemented through at least one software program running on at least one hardware device and performing network management functions to control the network elements. The network elements shown in FIGS. 1, 2, and 3 include blocks which can be at least one of a hardware device, or a combination of hardware device and software module.

The embodiment disclosed herein specifies a system for handling hand-off mechanism in a geo redundancy environment. The mechanism allows implementing hand-off mechanism by providing a system thereof. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented in pure hardware or partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A Media Gateway Controller in a communication network, said Media Gateway Controller, comprising:
    means for triggering hand-off for a plurality of media gateways controlled by said media gateway controller to;
    means for setting a flag for indicating hand-off to the plurality of media gateways;
    means for sending a service change reason and address of a secondary media gateway controller to the plurality of media gateways, and receiving a reply for said service change reason from at least one of the plurality of media gateways;

means for receiving a reply for said service change reason from said secondary media gateway controller;
means for rejecting any service change reasons from the plurality of media gateways after said media gateway controller is not available; and
means for, when a later registration request from one of the plurality of media gateways to said media gateway controller, checking stored flags in said media gateway controller, and if there is a flag indicating hand-off mechanism for said one of the plurality of media gateways, then rejecting the later registration request, and sending, to the plurality of media gateways, a new service change property indication and an address pointing to said secondary media gateway controller.

2. The media gateway controller as in claim 1, wherein said service change reason sent to said plurality of media gateways includes a reason for said service change and a property.

3. The media gateway controller as in claim 1, wherein said service change reason sent to said secondary media gateway controller includes a reason for said service change.

4. The media gateway controller as in claim 1, wherein said media gateway controller is functioning in a geo redundancy environment.

5. The media gateway controller as in claim 1, wherein said flag is sent to said plurality of media gateways in the form of a property.

6. The media gateway controller as in claim 1, wherein said media gateway controller communicates with said plurality of media gateways using H.248 protocol interface.

7. The media gateway controller of claim 1, further comprising means for validating, at said secondary media gateway controller, the service change reason.

8. The media gateway controller of claim 7, wherein the means for validating comprise means for checking whether the hand-off occurred between said media gateway controller and said secondary media gateway controller.

9. A Media Gateway in a communication network, said Media Gateway, comprising:
means for sending a service change reason to a secondary media gateway controller for registration when determining that a primary media gateway controller is not available;
means for receiving a reply for said service change reason from said secondary media gateway controller;
means for storing status of a flag received in said service change reason; means for sending said service change reason to said primary media gateway controller, when receiving an indication from said primary media gateway controller that said primary media gateway controller is back in normal operation;
means for receiving a reply for said service change reason from said primary media gateway controller;
means for, when a later registration request from said media gateway to said primary media gateway controller, checking stored flags in said primary media gateway controller, and if there is a flag indicating hand-off mechanism for said media gateway, receiving, from said primary media gateway controller, a new service change property indication and address pointing to said secondary media gateway controller, and then trying to register with said secondary media gateway controller with new service change reason; and
means for, when connectivity between said media gateway and said secondary media gateway controller is lost: checking stored flags in said media gateway, and if there is a flag indicating hand-off mechanism stored in said media gateway, then trying to register with said secondary media gateway controller by sending a new service change reason, the secondary media gateway controller accepting said media gateway registration request with said new service change reason.

10. The media gateway as in claim 9, wherein said reply for said service change reason includes a reason.

11. The media gateway as in claim 9, wherein said flag status is indicated to said media gateway via a property in said reply for service change.

12. The Media Gateway Controller of claim 9, further comprising means for validating, at secondary said secondary media gateway controller the service change reason.

13. The Media Gateway Controller of claim 12, wherein the means for validating comprise means for checking whether the hand-off occurred between said primary media gateway controller and said secondary media gateway controller.

14. A method for hand-off maintenance in a communication network, said network comprising a primary Media Gateway Controller, a secondary Media Gateway Controller and a plurality of Media Gateways, said method comprising:
setting, at the primary media gateway controller, a flag for the plurality of said media gateways indicating hand-off mechanism for said plurality of media gateways, when said primary media gateway controller is not available;
sending, at said primary media gateway controller, a service change reason and address of said secondary media gateway controller to the plurality of said media gateways;
sending, at said plurality of media gateways, said service change reason to said secondary media gateway controller;
storing, at said plurality of media gateways, a flag status received in said service change reason;
sending, at said plurality of media gateways, said service change reason to said secondary media gateway controller;
validating, at said secondary media gateway controller, said service change reason; and connecting, at said secondary media gateway controller, to said plurality of media gateways for providing service to said plurality of media gateways;
and wherein, when a later registration request from one of said plurality of media gateways to said primary media gateway controller, the method further comprises, checking stored flags in said primary media gateway controller, and if there is a flag for said one of said plurality of media gateways indicating hand-off mechanism for said one of said plurality of media gateways, then rejecting the later registration request, sending, at said primary media gateway controller, a new service change property indication and an address pointing to said secondary media gateway controller, then trying, at said plurality of media gateways, to register with said secondary media gateway controller with the new service change reason;
and wherein, when connectivity between one of said plurality of media gateways and said secondary media gateway controller is lost, checking stored flags in said one of said plurality of media gateways, and if there is a stored flag indicating hand-off mechanism, in said one of said plurality of media gateways, then trying, at said plurality of media gateways to register with said secondary media gateway controller by sending a new service change reason.

15. The method as in claim 14, wherein said method further comprises:

sending said service change reason to said primary media gateway controller, when said primary media gateway controller is back into normal operation; and receiving a reply for said service change reason from said primary media gateway controller, when said primary media gateway controller is back into normal operation.

16. The method as in claim 14, wherein said service change reason includes a reason for service change.

17. The method as in claim 14, wherein said plurality of media gateways communicate with said media gateway controller via H.248 protocol.

18. The method as in claim 14, wherein said flag is sent to said plurality of media gateways in the form of said property.

* * * * *